United States Patent [19]

Lyons et al.

[11] 4,409,369

[45] Oct. 11, 1983

[54] TRANSPARENT IMPACT RESIN AND PROCESS FOR THE PREPARATION THEREOF

[75] Inventors: Charles E. Lyons; Lu H. Tung, both of Midland, Mich.

[73] Assignee: The Dow Chemical Company, Midland, Mich.

[21] Appl. No.: 265,760

[22] Filed: May 21, 1981

Related U.S. Application Data

[63] Continuation-in-part of Ser. No. 126,796, Mar. 3, 1980, abandoned.

[51] Int. Cl.$^3$ .............................................. C08L 53/02
[52] U.S. Cl. .................................. 525/314; 524/151; 525/95
[58] Field of Search ........................................ 525/314

[56] References Cited

U.S. PATENT DOCUMENTS

| | | | |
|---|---|---|---|
| 3,251,905 | 5/1966 | Zelinski | 260/879 |
| 4,054,616 | 10/1977 | Miki | 260/880 B |
| 4,089,913 | 5/1978 | Miki | 525/314 |
| 4,096,205 | 6/1978 | Reith | 525/314 |
| 4,117,037 | 9/1978 | Himes | 525/314 |
| 4,148,771 | 4/1979 | Nash | 525/314 |
| 4,153,647 | 5/1979 | Glukhovskoi | 525/314 |

FOREIGN PATENT DOCUMENTS

| | | | |
|---|---|---|---|
| 2248458 | 4/1977 | Fed. Rep. of Germany | 525/314 |
| 49-46384 | 10/1974 | Japan | 525/314 |
| 1206800 | 9/1970 | United Kingdom | 525/314 |

OTHER PUBLICATIONS

Polymer Preprints, 18, 1, p. 838 (1977) Div. of Polymer Chem., (ACS) R. L. Kruse.
Angw. Makromol. Chem. 58–59, 175–198 (1977) A. Echte.
J. of Polymer Science (A–1), 4, 1595, (1966) Molau and Keskkula.

*Primary Examiner*—Paul Lieberman
*Attorney, Agent, or Firm*—R. B. Ingraham

[57] ABSTRACT

Styrene is polymerized employing a free radical initiator in the presence of a styrene-diene block copolymer of the AB or AB (BA)$_n$ configuration to provide a polymer containing from about 15 to 30 weight percent diene units polymerized therein. The polymer contains polydiene domains in the form of rods and spheres having diameters of 50 nanometers or less.

21 Claims, No Drawings

TRANSPARENT IMPACT RESIN AND PROCESS FOR THE PREPARATION THEREOF

This is a continuation-in-part of copending application Ser. No. 126,796, filed Mar. 3, 1980 now abandoned.

Transparent impact resistant styrene containing polymers are highly desirable for many applications, particularly in the field of packaging, and are suitable for such applications as tub and cup lids, blister packs and the like. Polystyrene is much too brittle for many applications and impact polystyrene does not have sufficient transparency for many of such packaging applications. Impact resistant transparent resins have been prepared by a variety of methods including the methods set forth in U.S. Pat. Nos. 4,054,616 and 3,251,905 employing anionic polymerization with butyllithium as initiator. Other techniques have employed methylmethacrylate in the styrene polymer to prepare impact resistant resins wherein the rubber domains would not significantly interfere with the transmission of light as described in U.S. Pat. No. 4,100,228.

It would be desirable if there were available an improved impact resistant transparent styrenic resin which did not require anionic polymerization and its attendant purity problems.

It would be desirable also if there were available an improved impact resistant transparent styrenic resin that contained as monomeric materials a styrene monomer and a conjugated diene monomer polymerized therein.

It would also be desirable if there were available an improved method for the preparation of such a resin.

These benefits and other advantages in accordance with the present invention are achieved in a transparent impact resistant alkenyl aromatic resin, the alkenyl aromatic resin being prepared by the polymerization of an alkenyl aromatic monomer in the presence of a block copolymer of the AB or AB(BA)$_n$ configuration wherein A represents a block of polymerized alkenyl aromatic monomer and B represents a block of diene polymer and n is an integer of from 1 to 5, the resin having a plurality of diene domains in the form of rods and spheres having diameters less than about 70 nanometers and without observable occlusions of polymerized alkenyl aromatic monomer.

Also contemplated within the scope of the invention is a method for the preparation of a transparent alkenyl aromatic resinous composition, the steps of the method comprising dissolving in at least one alkenyl aromatic monomer, a block copolymer of the AB or AB(BA)$_n$ configuration wherein A represents a block of polymer of the alkenyl aromatic monomer and B represents a block of conjugated diene polymer and n is an integer of from 1 to 5, the block copolymer having a weight average molecular weight above 40,000 gram moles and up to a molecular weight wherein a desired microstructure is not obtained, and preferably when butadiene block polymer is used from 40,000 to 150,000 gram moles, the block copolymer containing from 20 to 70 weight percent of alkenyl aromatic monomer and from 80 to 30 weight percent of conjugated diene therein, initiating polymerization of the alkenyl aromatic monomer by free radical initiating means, adding an antioxidant and recovering a polymer containing from 70 to 85 weight percent of alkenyl aromatic units polymerized therein and from about 15 to 30 weight percent of conjugated diene units polymerized therein, wherein the diene polymer domains are in the form of rods and spheres having diameters less than about 70 nanometers and no observable occlusion of polymerized alkenyl monomer therein.

By an alkenyl aromatic monomer is meant an alkenyl aromatic compound having the general formula:

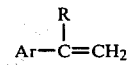

wherein "Ar" represents an aromatic hydrocarbon radical, or an aromatic halohydrocarbon radical of the benzene series, and "R" is hydrogen or the methyl radical. Examples of such alkenyl aromatic monomers are styrene, ortho-methylstyrene, meta-methyl-styrene, para-methyl-styrene, ar-ethylstyrene, ar-vinylxylene, mixtures thereof, and the like.

Block copolymers suitable for the practice of the invention are block copolymers of alkenyl aromatic monomer and diene of the AB or AB(BA)$_n$ configuration wherein A represents a block of polymerized alkenyl aromatic monomer and B is a block of polymerized conjugated diene such as polybutadiene, polyisoprene or copolymers of butadiene and isoprene and n is an integer of from 1 to 5, preferably n is one. The proportion of alkenyl aromatic monomer should be from about 20 to 70 weight percent and the proportion of diene from about 80 to 30 weight percent with the further limitation that the weight average molecular weight is above 40,000 gram moles as determined by gel permeation chromatography and up to a molecular weight wherein the desired microstructure is not obtained. Copolymers of butadiene and isoprene are also useful as the B block. The preparation of such block copolymers is well known in the art and is set forth in U.S. Pat. Nos. 3,030,346; 3,149,182; and 3,317,918, the teachings of which are incorporated by reference thereto.

Polymers in accordance with the present invention are believed to be a mixture of a variety of components. The matrix is principally polyalkenyl aromatic monomer having a weight average molecular weight as determined by gel permeation chromatography of from about 75,000 to 350,000 gram moles. It is believed some graft copolymer exists wherein the alkenyl aromatic monomer has grafted onto the block copolymer.

In the preparation of polymers in accordance with the present invention, it is generally desirable to initiate polymerization with a free radical initiator or monomer soluble peroxy initiator having a half life of 1 hour or less at 110° C. However, other peroxy initiators may also be employed. Useful initiators include 4-(t-Butyl)-1,1-bis(t-butylperoxy) cyclohexane, benzoyl peroxide, and lauroyl peroxide and the like. Generally, the amount of initiator employed is in a range of about 0.025 to 0.2 weight percent based on the combined weight of the monomer plus block copolymer.

Oftentimes it is desirable to employ a chain transfer agent to help maintain the molecular weight of the polymer in a desirable range. Suitable chain transfer agents include organic thiols such as aliphatic mercaptans typically dodecyl mercaptan, halogenated hydrocarbons such as carbon tetrachloride, alpha-methyl-styrene dimer and the like. Such chain transfer agents when added are generally in a concentration of from about 0.001 to 0.5 weight percent based on the combined weight of monomer plus block copolymer. An antioxidant is added at or near the end of the polymerization to prevent crosslinking between the diene polymer blocks. Such antioxidants are well known to those skilled in the art and include hindered phenols such as 2,6-di(tertiarybutyl)-4-methylphenol and combinations of hindered phenols, alkylated aryl phosphites and the like.

Generally, polymers in accordance with the present invention are prepared by polymerization in mass, solution or suspension at temperatures ranging from about 105° to about 175° C. If desired, inert solvents may be incorporated prior to polymerization in order to reduce the viscosity of the reaction mixture. Typical solvents include benzene, toluene, xylene, ethylbenzene, cyclohexane, methylcyclohexane and the like. On completion of the polymerization step, such solvents are generally removed from the polymer by exposing molten polymer to reduced pressure such as from about 0.1 to about 100 millimeters of mercury until the solvents and residual monomer have been removed from the polymer. The resultant polymer compositions may be directly heat fabricated into a desired form such as sheet film or the like, or extruded as strands, the strands being cooled and cut into pellets.

The invention is further illustrated but not limited by the following examples, wherein all parts and percentages are by weight unless otherwise specified.

EXAMPLE 1

An agitated pressure reactor was charged with 115 grams of a styrene-butadiene block elastomer dissolved in 334 grams of styrene, 121 grams of ethylbenzene. The block copolymer had a weight average molecular weight of 90,000 gram moles as determined by gel permeation chromatography and contained 45 weight percent styrene and 55 weight percent butadiene. One and one-tenth grams of alphamethylstyrene dimer was employed as a chain transfer agent together with 1.7 grams of mineral oil as a lubricant and 0.24 grams of 4-(tertiarybutyl)-1,1-bis-(tertiarybutylperoxy)cyclohexane as free radical initiator. The resultant reaction mixture was heated to 105° and agitated by an agitator rotating at about 30 revolutions per minute. Over a period of 5½ hours the temperature of the reaction mixture was increased from 105° to 155° C. At this time, 2.8 grams of 2,6-di-(tert-butyl)-4-methylphenol and 1.8 grams of tris-nonylphenyl phosphite were added as antioxidants. When the antioxidants had been dispersed in the reaction mixture, the reaction mixture was placed in trays and heated in a vacuum oven at 175° for one and one-half hours under a pressure of 20 millimeters of mercury to remove ethylbenzene and unreacted styrene. The resulting polymer product contained about 19 weight percent polymerized butadiene units therein. The resultant polymer was ground and test bars compression molded therefrom. The following results were obtained: Notched Izod impact, 0.38 ft-lbs/inch notch; tensile strength at rupture, 3375 pounds per square inch; tensile modulus 248,000 pounds per square inch; Vicat heat distortion temperature 207° F.; and melt flow rate using condition G of 1.71 grams.

A 10 mil thick sheet was molded from the polymer and examined for light absorbence in a Beckman Model B spectrophotometer. The wave length employed was 640 nanometers and the film was placed about 9 centimeters from the center of the photocell light detector. The light absorbency was 0.07. An electron micrograph of sections of the molded specimen showed polybutadiene domains having the shapes of rods and spheres of about 35 nanometers in diameter and no visible occluded polystyrene.

EXAMPLE 2

In a manner similar to Example 1, a plurality of polymerizations were conducted by utilizing a variety of styrene-butadiene block copolymers. The results are set forth in Table I wherein product composition S/B indicates the weight ratio of styrene to butadiene units in the final product. Under the heading of Elastomer S/B comp. is the weight proportion of styrene to butadiene in the block copolymer and $\overline{M}w$ is its weight average molecular weight in gram moles; n.Izod impact is the notched Izod impact; H.D. indicates heat distortion in degrees Fahrenheit; nm, nanometers; MFR Sch. G., melt flow rate, schedule G.

TABLE I

| Product Comp. S/B | Elastomer S/B COMP. | Mw | n. Izod imp. (Ft.-lbs./in.-Notch) | Tensile Rupture (psi) | Modulus (psi) | Vicat H.D. (°F.) | Absorbance (10-mils at 640 nm) | MFR (Sch. G.) | Polybutadiene Domain Shape and Dia. Sizes |
|---|---|---|---|---|---|---|---|---|---|
| 80/20 | 27/73 | 113,000 | 0.56 | 2237 | 216,000 | 212 | 0.16 | 0.89 | rods & core & shell |
| 82/18 | 39/61 | 169,000 | 0.51 | 2999 | 267,000 | 210 | 0.14 | 0.31 | rods & core & shell |
| 78/22 | 39/61 | 73,000 | 0.55 | 1938 | 176,000 | 207 | 0.09 | 4.66 | rods & spheres, 30 nm. |
| 79/21 | 42/58 | 98,000 | 0.43 | 2560 | 226,000 | 207 | 0.08 | 2.60 | rods & spheres, 35 nm. |
| 83/17 | 47/53 | 82,000 | 0.34 | 3213 | 260,000 | 212 | 0.07 | 2.02 | rods & spheres, 35 nm. |
| 81/19 | 55/45 | 105,000 | 0.85 | 3799 | 261,000 | 210 | 0.06 | 1.70 | rods & spheres, 30 nm. |
| 80/20 | 60/40 | 132,000 | 0.44 | 2484 | 215,000 | 212 | 0.06 | 2.14 | rods & spheres, 40 nm. |

All polymerizations were made using 500 ppm (based on styrene plus elastomer) of 4-(t-butyl)-1,1-bis(t-butylperoxy)cyclohexane.
Ethylbenzene diluent was used in all the polymerizations at the level of 15-22% of the total feed solution. 0.2-0.4 Percent alpha-methylstyrene dimer C.T. agent and 0.3% mineral oil were also included in the feed solutions.
All product polymers contain 1% 2,6-di-tert-butyl-4-methylphenol and 0.5% tris nonylphenyl phosphite antioxidants.

For the purpose of comparison, the first two runs in Table I used block copolymers outside the preferred range of composition (1st run) and molecular weight (2nd run). Both runs were unsatisfactory as the products had high absorbence of light. Electronmicroscopy showed that the polybutadiene domains of both products contain the "core and shell" structure. This structure consists of a polybutadiene shell of diameter larger than 100 nanometers and an occluded polystyrene core.

EXAMPLE 3

In a manner generally similar to Example 1, a plurality of polymerizations were conducted utilizing a variety of block copolymers containing styrene and isoprene and some block copolymers of styrene with isoprene and butadiene copolymer blocks. The results are set forth in Table II, wherein the term "S/I" designates a styrene isoprene block copolymer; the heading "Comp" indicates the weight percent composition and under "M.W." the weight average molecular weight as determined by gel permeation chromatography. Under "Comments", the letters refer to footnotes indicating deviation from the procedure used in Example 1. All of the resultant polymers prepared indicated polydiene domains having the shapes of rods and spheres and less than about 50 nanometers in diameter with no visible occluded polystyrene. The stabilizers employed were either a mixture of 2,6-di-(tert-butyl)-4-methylphenol with trisnonylphenyl phosphite as employed in Example 1; or (n-octadecyl-3-(4-hydroxy-3,5-ditert-butylphenyl)-propionate), to provide a level of about 0.2 weight percent in the final product.

TABLE II

| Product Comp. S/Diene | Elastomer Type | Comp. | M.W. | n. Izod imp (Ft.-lbs./in.-Notch) | Tensile Rupture (psi) | Modulus (psi) | Vicat H.D. (°F.) | Absorbance (10-mils at 640 nm) | MFR (Sch. G) | Comments |
|---|---|---|---|---|---|---|---|---|---|---|
| 79/21 | S/I | 50/50 | 67,700 | 0.20 | 1387 | 290,000 | — | 0.06 | 121.1 | A |
| 82/18 | S/I | 40/60 | 102,700 | 0.30 | 1771 | 230,000 | — | 0.07 | 41.6 | A |
| 78/22 | S/I | 50/50 | 125,000 | 0.34 | 1014 | 180,000 | 194° | 0.09 | 14.2 | B |
| 82/18 | S/I | 40/60 | 169,700 | 0.44 | 2490 | 320,000 | 210° | 0.06 | 9.1 | B |
| 78/22 | S/I | 50/50 | 228,000 | 0.42 | 2438 | 259,000 | 187° | 0.07 | 6.7 | B |
| 78/22 | S/I | 50/50 | 196,000 | 0.43 | 2071 | 262,000 | 214° | 0.07 | 2.6 | C |
| 78/22 | S/I-B | 50/25-25 | 76,000 | 0.37 | 2491 | 254,000 | 210° | 0.06 | 6.3 | B |
| 77/23 | Tapered S/I/S | 25/50/25 | 232,000 | 0.50 | 2119 | 202,000 | 212° | 0.07 | 1.4 | C |
| 78/22 | S/I/S | 7/86/7 | 180,000 | 1.54 | 1114 | 182,000 | 201° | 0.13 | 2.4 | C |
| 82/18 | S/I-B | 40/15-45 | 90,000 | 0.43 | 1915 | 264,000 | 205° | 0.10 | 0.4 | C |
| 79/21 | S/I/S | 17.5/65/17.5 | 147,300 | 0.35 | 2363 | 250,000 | 207° | 0.09 | 6.1 | C |

A = Same additives and conditions as Example 1.
B = Same additives and conditions as Example 1 except no alphamethylstyrene dimer used.
C = Same conditions as Example 1 with the exception that no alphamethylstyrene used, and (n-octadecyl-3-(4-hydroxy-3,5-di-tert-butylphenyl)-propionate) as stabilizer.

In a manner similar to the foregoing examples, other alkenyl aromatic monomers and mixtures thereof are readily employed to provide transparent impact resisting resins.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A transparent impact resistant alkenyl aromatic resin, the alkenyl aromatic resin being prepared by the free radical polymerization of a monomer, the monomer consisting essentially of an alkenyl aromatic monomer, in the presence of a block copolymer of the AB or AB(BA)$_n$ configuration wherein A represents a block of polymerized alkenyl aromatic monomer and B represents a block of diene polymer and n is an integer of from 1 to 5, the resin having a plurality of diene domains in the form of rods and spheres having diameters less than about 70 nanometers and without observable occlusions of polymerized alkenyl aromatic monomer.

2. The resin of claim 1 wherein the block copolymer is a styrene butadiene polymer having a molecular weight of from about 40,000 to 150,000 gram moles.

3. The resin of claim 2 wherein the block copolymer contains from about 30 to 70 weight percent alkenyl aromatic monomer and 70 to 30 weight percent butadiene polymerized therein.

4. The resin of claim 1 which contains from about 70 to 85 weight percent styrene and 30 to 15 weight percent butadiene polymerized therein.

5. The resin of claim 1 wherein the alkenyl aromatic resin has a molecular weight of from about 75,000 to 350,000 gram moles.

6. The resin of claim 2 having an antioxidant admixed therewith.

7. The resin of claim 1 wherein the diene is polyisoprene.

8. The resin of claim 1 wherein the diene is a copolymer of butadiene and isoprene.

9. The resin of claim 1 wherein the alkenyl aromatic monomer is styrene.

10. The resin of claim 1 wherein the alkenyl aromatic monomer is para-methylstyrene.

11. The resin of claim 1 wherein n is one.

12. A method for the preparation of a transparent alkenyl aromatic resinous composition, the steps of the method comprising dissolving in at least one monomer, the monomer consisting essentially of an alkenyl aromatic monomer, a block copolymer of the AB or AB(BA)$_n$ configuration wherein A represents a block of polymer of the alkenyl aromatic monomer and B represents a block of conjugated diene polymer and n is an integer of from 1 to 5, the block copolymer having a weight average molecular weight above 40,000 gram moles and up to a molecular weight wherein a desired microstructure is not obtained, and the block copolymer containing from 20 to 70 weight percent of alkenyl aromatic monomer and from 80 to 30 weight percent of conjugated diene therein, initiating polymerization of the alkenyl aromatic monomer by free radical initiating means, adding an antioxidant and recovering a polymer containing from 70 to 85 weight percent of alkenyl aromatic units polymerized therein and from about 15 to 30 weight percent of conjugated diene units polymerized therein, wherein the diene polymer domains are in the form of rods and spheres having diameters less than about 70 nanometers and no observable occlusion of polymerized alkenyl monomer therein.

13. The method of claim 12 wherein the free radical initiating means is an aromatic peroxide having a half life of one hour or less at 110° Centigrade.

14. The method of claim 12 including the step of admixing with the alkenyl aromatic monomer to be polymerized from about 0.001 to about 0.5 weight percent based on the weight of the monomer and block copolymer of chain transfer agent.

15. The method of claim 12 wherein the alkenyl aromatic monomer is styrene.

16. The method of claim 12 wherein the polymer is recovered by evaporating residual monomer and/or solvent.

17. The method of claim 12 wherein the alkenyl aromatic monomer is para-methylstyrene.

18. The method of claim 12 wherein the diene is polyisoprene.

19. The method of claim 12 wherein the diene is polybutadiene.

20. The method of claim 12 wherein the diene is a copolymer of butadiene and isoprene.

21. The method of claim 12 wherein n is one.

* * * * *